US012123523B2

(12) United States Patent
Wong et al.

(10) Patent No.: US 12,123,523 B2
(45) Date of Patent: Oct. 22, 2024

(54) MULTI PIPE CONNECTOR (71) Applicant: National Diversified Sales, Inc., Woodland Hills, CA (US)

(72) Inventors: Wai Keong Bryce Wong, Tulare, CA (US); David Rusch, Springville, CA (US); Ryan Larsen, Visalia, CA (US); Daniel Nourian, Reedley, CA (US); Michael Schreiber, York, PA (US)

(73) Assignee: National Diversified Sales, Inc., Woodland Hills, CA (US)

( * ) Notice: Subject to any disclaimer, the term of this patent is extended or adjusted under 35 U.S.C. 154(b) by 206 days.

(21) Appl. No.: 17/709,285

(22) Filed: Mar. 30, 2022

(65) Prior Publication Data

US 2023/0313925 A1 Oct. 5, 2023

(51) Int. Cl.
*F16L 25/00* (2006.01)
*F16L 25/14* (2006.01)

(52) U.S. Cl.
CPC ........... *F16L 25/0045* (2013.01); *F16L 25/14* (2013.01)

(58) Field of Classification Search
CPC . F16L 5/027; F16L 41/08; F16L 41/12; F16L 25/0045; F16L 37/0985; F16L 37/008; H02G 3/0691
See application file for complete search history.

(56) References Cited

U.S. PATENT DOCUMENTS

| | | | |
|---|---|---|---|
| 2,784,987 A | 3/1957 | Corcoran | |
| 3,724,882 A | 4/1973 | Dehar | |
| 4,214,779 A | 7/1980 | Losell | |
| 4,373,753 A | 2/1983 | Ayers et al. | |
| 4,575,133 A * | 3/1986 | Nattel | H02G 3/0691 285/423 |
| 4,711,472 A | 12/1987 | Schnell | |
| 4,923,227 A | 5/1990 | Petty et al. | |
| 5,204,499 A * | 4/1993 | Favalora | H02G 3/0691 174/669 |
| 5,346,264 A * | 9/1994 | Law | F16L 25/0045 285/903 |
| 6,007,110 A | 12/1999 | Amatsutsu | |
| 6,143,983 A * | 11/2000 | Burton | H02G 3/18 174/669 |
| 6,523,864 B1 * | 2/2003 | Discher | F16L 37/0985 285/379 |
| 7,303,357 B2 * | 12/2007 | Villarreal | E03F 5/0401 405/36 |
| 7,651,297 B2 | 1/2010 | Villareal et al. | |
| 7,871,109 B1 * | 1/2011 | McKinnon | F16L 37/098 285/903 |
| 10,323,778 B2 * | 6/2019 | Rusch | F16L 23/00 |

FOREIGN PATENT DOCUMENTS

| | | | | |
|---|---|---|---|---|
| DE | 8916242 U1 * | 2/1996 | ......... | F16L 25/0045 |
| FR | 3050582 A1 * | 10/2017 | ......... | H02G 3/0633 |

* cited by examiner

*Primary Examiner* — Zachary T Dragicevich
*Assistant Examiner* — Alexander T Rufrano
(74) *Attorney, Agent, or Firm* — Fulwider Patton LLP (57) ABSTRACT

A pipe connector comprises a circular flange having a central opening. A downstream sleeve having a circular cylindrical form about an axis with a proximal end and a terminal distal end, is attached to the circular flange by the proximal end and comprises at least one first type of detent and at least one second type of detent.

5 Claims, 8 Drawing Sheets

MULTI PIPE CONNECTOR

BACKGROUND

The present invention relates to pipe connectors, and particularly to multi-pipe connectors.

In general, there are many pipe connectors that are well known and well developed in the art. Such connectors may be used in the case of connecting pipes of equal diameter to each other to create a continuous flow between each other. In other cases connectors may be used for connecting two pipes of different diameter to each other. In yet other cases, pipe connectors may be used for providing a means for connecting a first pipe to a second pipe for which the second pipe diameter is not limited to only one diameter option but a choice of diameters is possible. Sometimes it is useful to present a pipe fitter with the option of connecting a first pipe with, potentially, more than one alternative pipes of varying diameter.

Figure 2:
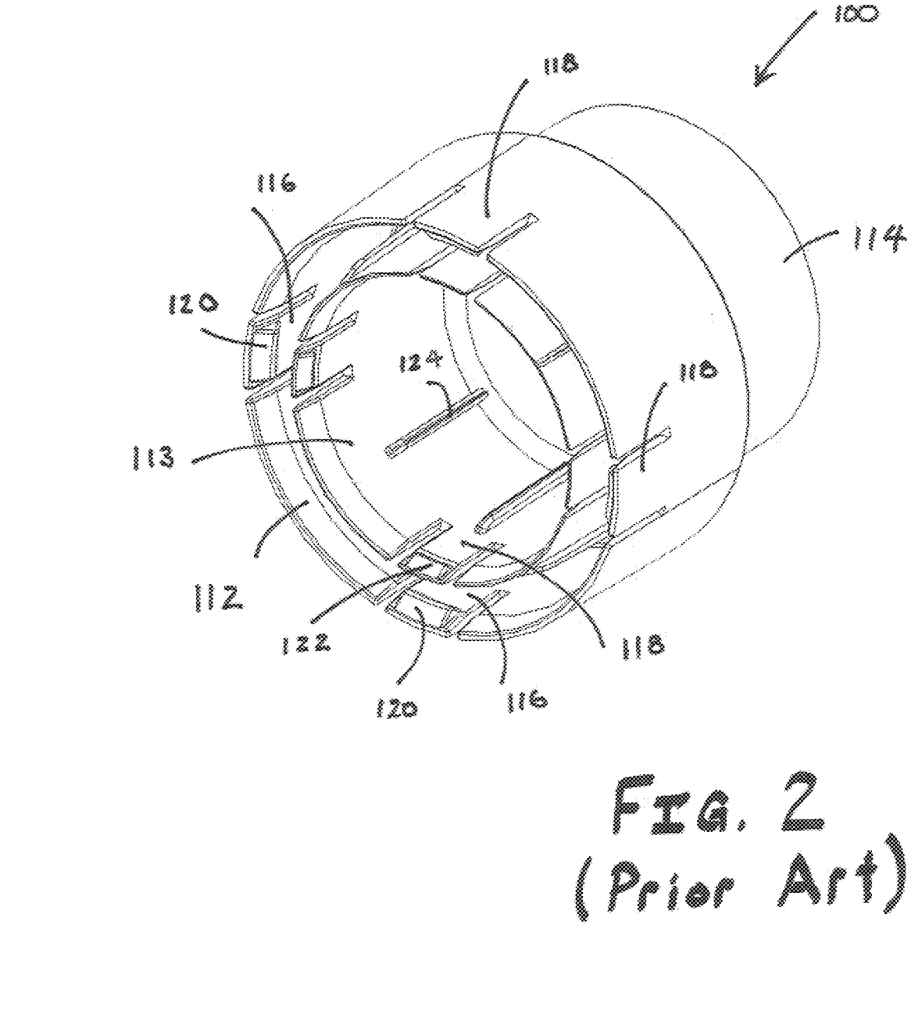
FIG. 2 shows a perspective view of a pipe connector known in the prior art.
Figure 3:
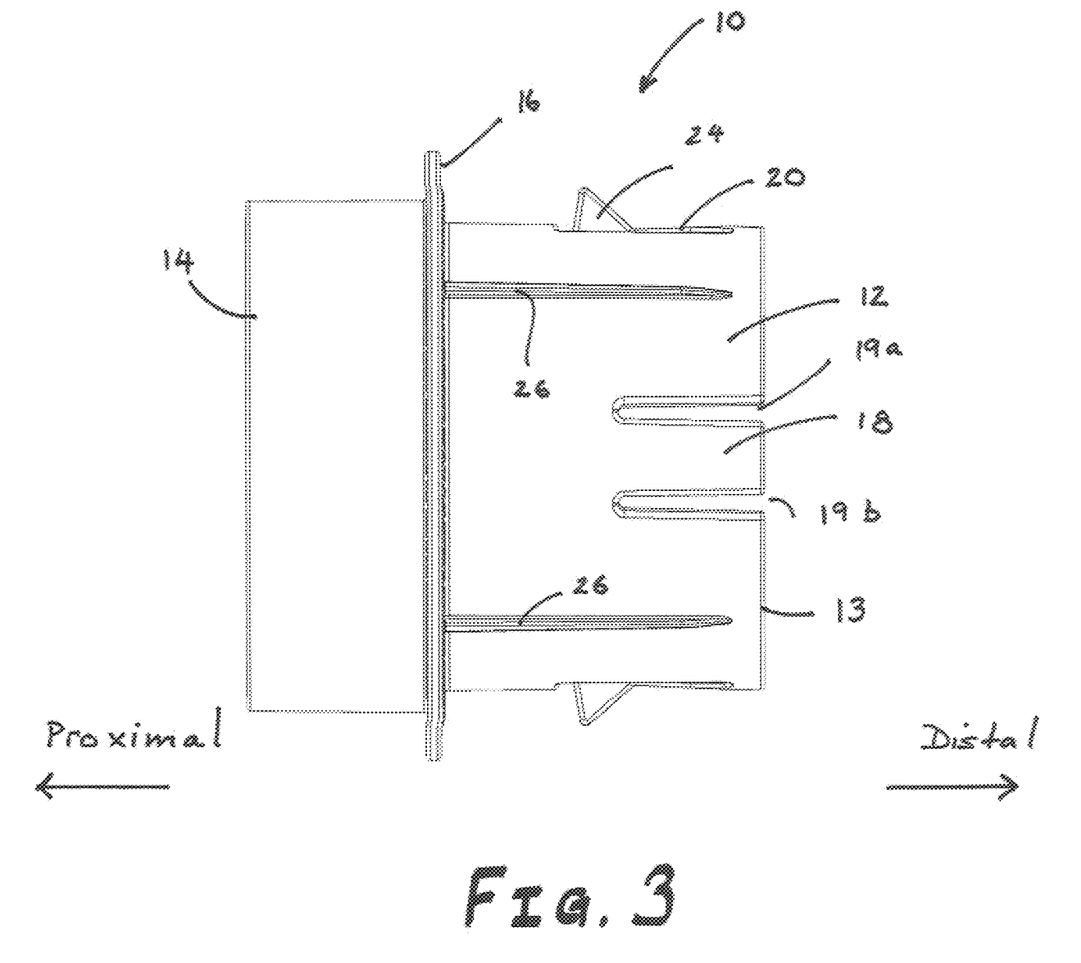
FIG. 3 shows a side view of the pipe connector shown in FIG. 1.
Figure 4:
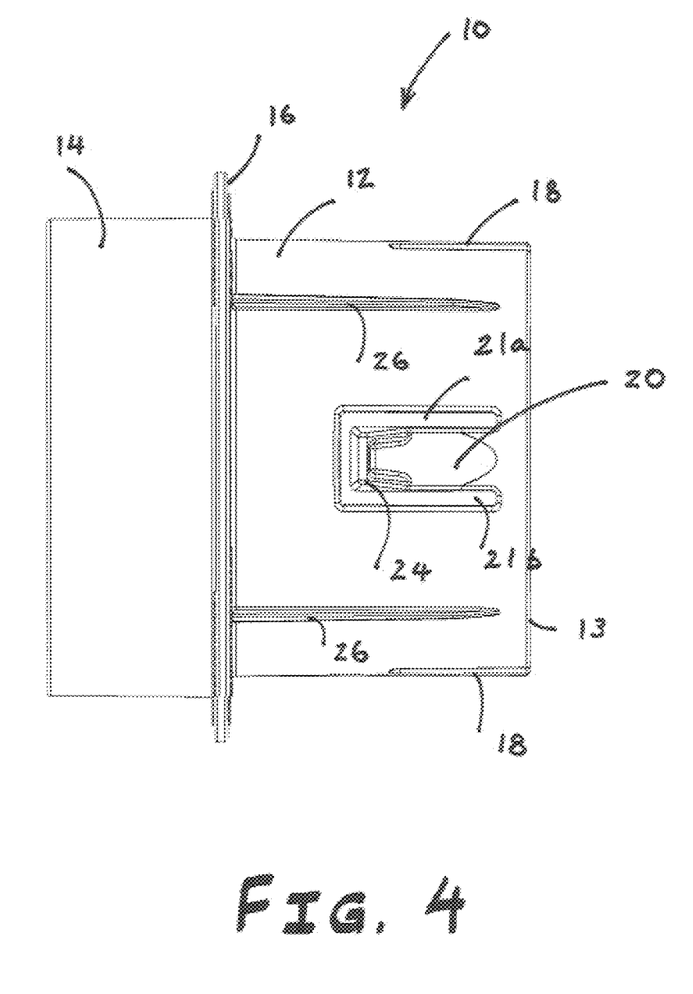
FIG. 4 shows a top view of the pipe connector shown in FIG. 1.
Figure 5:
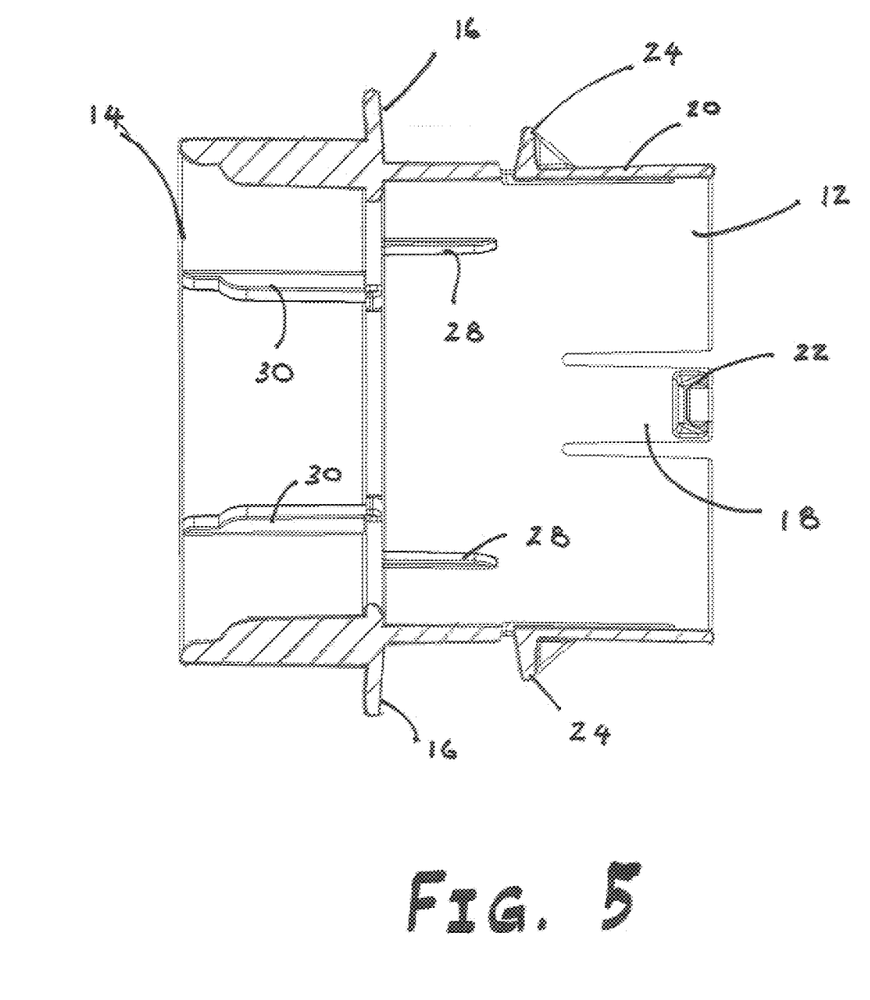
FIG. 5 shows a sectional view, from the side, of the pipe connector shown in FIG. 1.

One such pipe connector, known in the prior art, is shown in FIG. 2 under reference numeral 100. Here, the pipe connector 100 starts with an upstream sleeve 114, which has an internal diameter sized to slide over a first pipe (not shown) having a fixed and known external diameter. The joint between the upstream sleeve 114 and the first pipe need not be water tight, but a resulting dry joint may be improved through the addition of a sealing compound in the joint. On the opposite end of the connector 100 are two downstream sleeves—an outer downstream sleeve 112 and inner downstream sleeve 113. The pipe fitter has the choice of connecting a second pipe into the inner bore of either of these downstream sleeves. A larger diameter second pipe may be slipped within the bore of the outer downstream sleeve 112 (between the outer 112 and the inner 113 sleeve), or a smaller diameter second pipe may be slipped within the bore of the inner sleeve 113. Each of the downstream sleeves has a plurality of cantilevered detents 116 and 118, typically four on each sleeve which are formed by molding into the surface of the downstream sleeves. The detents 116, 118 are tipped with a radially inwardly extending finger 120, 122 respectively. These cantilevered detents with their inwardly extending fingers are useful in mechanically engaging a second pipe which has a corrugated configuration, and the fingers 120, 122 are sized to fit snugly in a depression in the corrugation, thereby holding the second pipe securely onto the connector 100. Where the second pipe is not corrugated, the detents simply ride up onto the outer surface of the second pipe, and provide some resistance against separation through friction. Further features of the prior art include shoulders 124 which are configured to be ramped so as to provide increasing frictional attachment to a pipe that is inserted into the bore of the sleeve.

As used herein, the terms "upstream" and "downstream" are interchangeable, because the direction of fluid flow in the invention has no effect on the structure of the invention, and vice versa.

However, despite the versatility of the pipe connector 100 with multiple downstream pipe size options that are found in the prior art, a problem arises from the complexity of the shape of the connector, with manufacturing steps including complex molding and extraction with refined details which are always difficult to incorporate into the molding process.

Thus, there is a need in the art for a connector with multi pipe options that eliminates the complexity and difficulty of manufacture in the prior art. The present invention addresses these and other needs.

SUMMARY OF THE INVENTION

In a preferred embodiment, the invention is a pipe connector comprising a circular flange having a central opening. A downstream sleeve is provided, having a circular cylindrical form about an axis with a proximal end and a terminal distal end. The downstream sleeve is attached to the circular flange by the proximal end and it comprises at least one first detent and at least one second detent. The at least one first detent comprises a first cantilever having a proximal end and a distal end, the first cantilever being flanked by two parallel slots extending axially through the downstream sleeve such that the two parallel slots terminate in conjunction with the terminal distal end of the downstream sleeve. The first cantilever is fixed at the proximal end to the downstream sleeve whereby the distal end is free to move radially inwardly and, alternatively, outwardly in relation to the downstream sleeve. Furthermore the distal end of the first cantilever defines a first finger element that extends radially inwardly in relation to the downstream sleeve, the first finger element being configured for providing a mechanical restraint against axial movement by a corrugated pipe installed within a bore of the downstream sleeve. Further, the at least one second detent comprises a second cantilever having a proximal end and a distal end, the second cantilever being flanked by two parallel slots extending axially and by a third slot extending circumferentially through the downstream sleeve, and being fixed at the distal end to the downstream sleeve—whereby the proximal end is free to move radially inwardly and, alternatively, outwardly in relation to the downstream sleeve. The proximal end defines a second finger element that extends radially outwardly in relation to the downstream sleeve, the second finger element being configured for providing a mechanical restraint against axial movement by a corrugated pipe installed external to the downstream sleeve.

In some embodiments, the pipe connector may comprise an upstream sleeve, having a circular cylindrical form about an axis, attached to the circular flange such that the downstream sleeve and the upstream sleeve are coaxial with each other.

In yet other embodiments, the pipe connector may comprise a stub cylinder attached to the circular flange such that the downstream sleeve and the stub cylinder are coaxial with each other, the stub cylinder defining at least one ramped detent configured for drawing the circular flange towards a catch basin wall when the stub cylinder is inserted into an aperture in the catch basin wall.

In some embodiments, the at least one first detent is two first detents in number. And in further embodiments, the at least one second detent is two second detents in number.

Other objects, features and advantages of the present invention will be apparent when the disclosure is considered in conjunction with the drawings set forth herein, which should be construed in an illustrative and not limiting sense.

BRIEF DESCRIPTION OF THE DRAWINGS

The present invention is described in detail below with reference to the attached drawing figures, wherein.

In the following detailed description, certain preferred embodiments are described in order to provide a thorough understanding of the present invention.

Reference will hereinafter be made to the drawings in which similar elements in different drawings bear the same reference numerals.

DETAILED DESCRIPTION OF THE PREFERRED EMBODIMENTS

With reference to the figures, the invention is a pipe connector adapted to connect an input source of fluid flow to an output conduit, wherein the output conduit may be selected from a plurality of conduits of different diameter.

Figure 1:
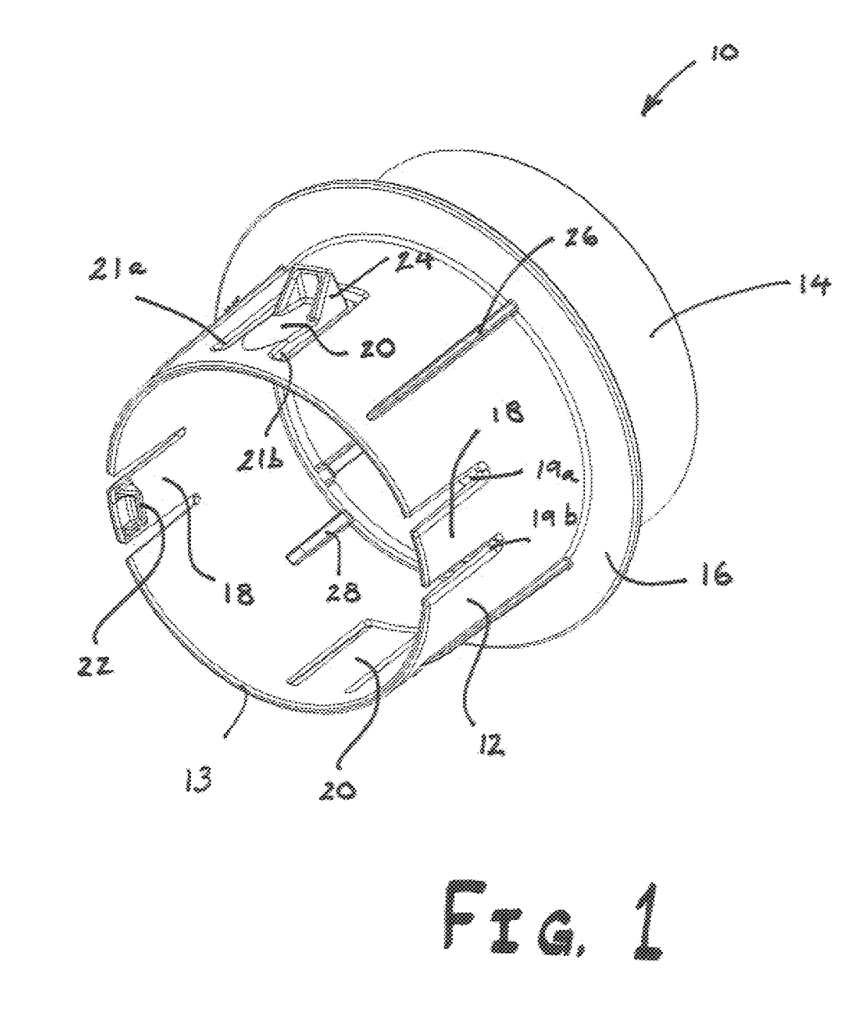
FIG. 1 shows a perspective view of one embodiment of a pipe connector showing features of the invention.

FIG. 1 shows an embodiment of the invention, in the form of a pipe connector 10 which is configured to provide fluid flow between a first pipe (not shown in FIG. 1) and a second pipe (not shown in FIG. 1). The connector 10 of this embodiment comprises an upstream sleeve 14 (or proximal sleeve) which has an internal diameter sized to slide over a first pipe (not shown in FIG. 1) having a fixed and known external diameter. On the opposite end of the connector 10 is a single downstream sleeve 12 (or distal sleeve). Between the upstream sleeve 12 and the downstream sleeve 14 is positioned a flange 16, which is sized to allow both upstream and downstream sleeves to connect to the flange, and wherein the flange acts as an internal and external stop against movement of first and second pipes that are loaded onto the sleeves 12, 14.

The downstream sleeve 12 is specially configured to provide a new and advantageous sleeve structure that will permit either one of two different diameter second pipes to be attached to the downstream sleeve.

A first aspect of this structure is that the sleeve 12 comprises at least one detent of a first type (preferably two), which comprises a distally extending cantilever 18 that is formed (during the molding process) by providing two parallel slots 19a, 19b extending axially from, and intersecting with, a distal perimeter 13 of the sleeve 12. The slots extend axially towards the flange 16 end of the sleeve, for a distance of about 1 inch. The proximal, connected, end of the cantilever forms a continuous connection into the sleeve 12. At the distal tip of the cantilever 18 a finger 22 is formed that extends radially inwardly into a bore of the sleeve 12. The function of the detent (cantilever 18 and finger 22) is to grip onto a second pipe (not shown in the figures) which may be inserted snugly into the bore of the downstream sleeve 12. The finger 22 is especially useful for gripping onto a pipe which is corrugated, insofar as the corrugations will provide a recess into which the finger 22 may be inserted for gripping onto the pipe. Where the second pipe is not corrugated, the finger is forced to move radially outwardly, but will apply a frictional grip for retention.

A second feature of the downstream sleeve, is a detent of a second type, preferably two in number, which may be spaced between the first type detents. The second type of detent has some similar features to the first type of detent. It has a cantilever portion 20, set in the surface of the sleeve 12 and surrounded by two parallel slots 21a, 21b extending axially through the sleeve. However in this case, the slots do not terminate on the distal perimeter of the sleeve. Rather, they terminate about 3 eighths of an inch proximally of the distal perimeter, and a third slot 21c is molded into the sleeve to join the two parallel slots at their proximal ends. At the proximal end of the cantilever 20, a finger 24 is formed on the cantilever, but it extends radially outwardly, away from the center of the sleeve. Thus, the second type of cantilever 20 can flex about its point of connection to the sleeve, to permit the finger 24 to move radially outwardly. This structure provides the novel and useful feature of allowing the sleeve to electively receive a third pipe rather than the second pipe, of different diameter than the second pipe, to snugly fit on the outside surface of the downstream sleeve 12. The same usefulness arises if the third pipe is corrugated, so that the finger 24 may fit into a recess of the corrugation and hold the third pipe in a fixed position in relation to the connector 10.

It will be appreciated by one of ordinary skill that the structure of the downstream sleeve 12 has two different types of detent with cantilevers 18, 20.

The first type has cantilevers 18 that are flanked by slots 19a, 19b that intersect with the distal perimeter 13 of the sleeve 14. This intersection means that the distal perimeter is not continuous, but broken by the slots. One of ordinary skill will understand that the discontinuity in the perimeter 13 allows the perimeter to be more circumferentially flexible than if it were continuous. Such flexibility is useful in that it more easily allows the insertion, into the bore of the sleeve 12, a pipe that might be slightly oversized. The flexible perimeter more easily accommodates such oversized pipes.

On the other hand, the second type has cantilevers 20 flanked by slots 21a, 21b, 21c that do not intersect with the distal perimeter 13 of the sleeve, and the perimeter 13 adjacent the second type detents is continuous.

One of ordinary skill would understand that the existence of slots 21a and 21b allows cantilevers 20 to be more circumferentially flexible than without the slots. Such a flexibility is useful in that it allows for the insertion of multiple pipe variants without the risk of finger 24 obstructing the passage, should a different pipe other than a corrugated type be used. When cantilever 20 is undergoing bending stress due to the insertion of a pipe, there is a tendency for it to return to its original elastic form, absent of any plastic deformation. The upwards motion of cantilever 20 in a direction normal to the tip of finger 24 allows a pipe to be held more snugly that it otherwise would as finger 24 is contacting the inner ridges of a corrugated pipe or the solid, inner walls of a regular extruded circular pipe attachment.

Thus, the present invention has the advantage over the prior art of eliminating one of the downstream sleeves 112 or 113 (FIG. 2), and yet to provide the same result which is to permit a pipe fitter to choose between a second pipe or a third pipe having a larger diameter, for connection to the connector 10 and thus to a first pipe that is fitted to the upstream sleeve 14

Additional features of the pipe connector include shoulders 26, 28 which are preferably ramped towards the flange 16, so as to provide enhanced frictional attachment to a pipe that may be installed inside the bore of the sleeve 12, or on the outer surface of the sleeve.

Figure 6:
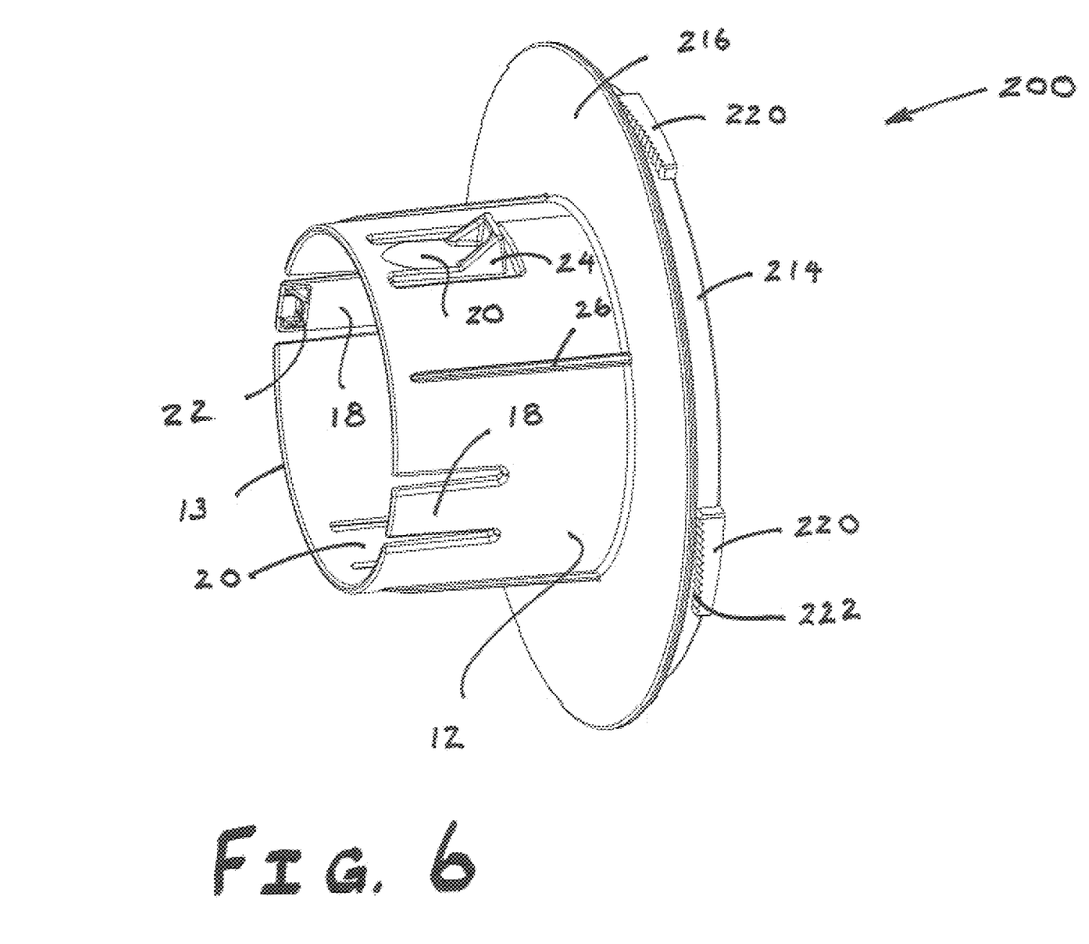
FIG. 6 shows a perspective view of a second embodiment of a pipe connector showing features of the invention.
Figure 7:
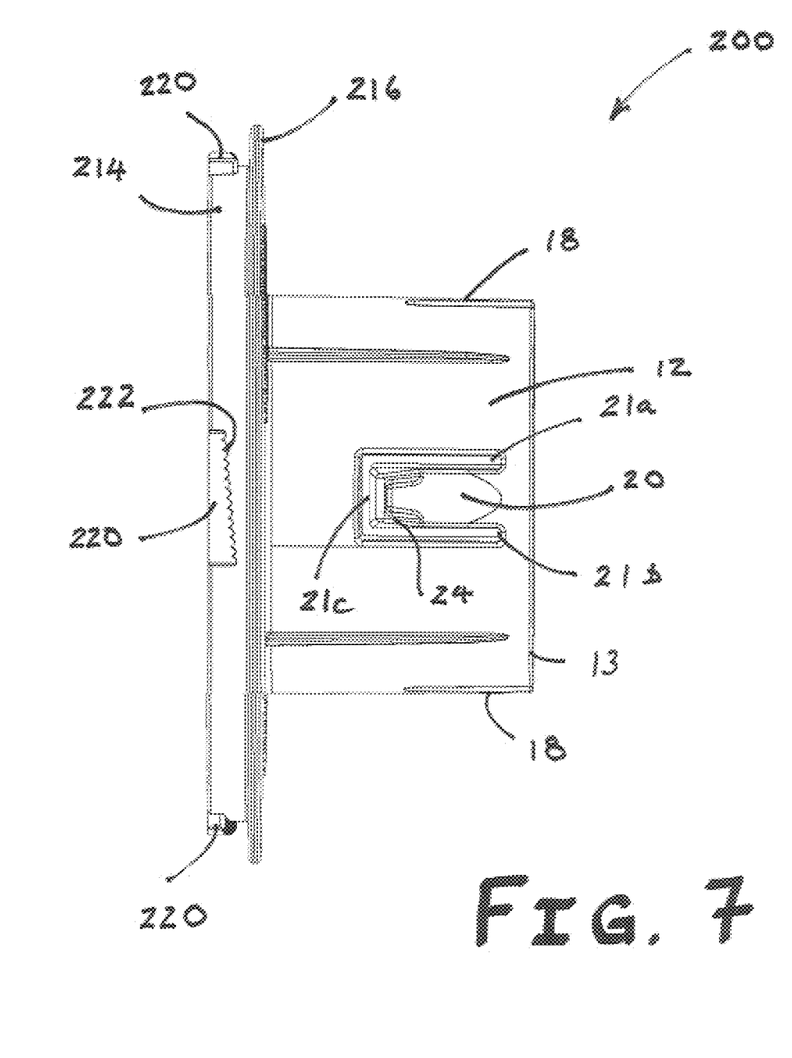
FIG. 7 shows a top view of the pipe connector shown in FIG. 6.
Figure 8:
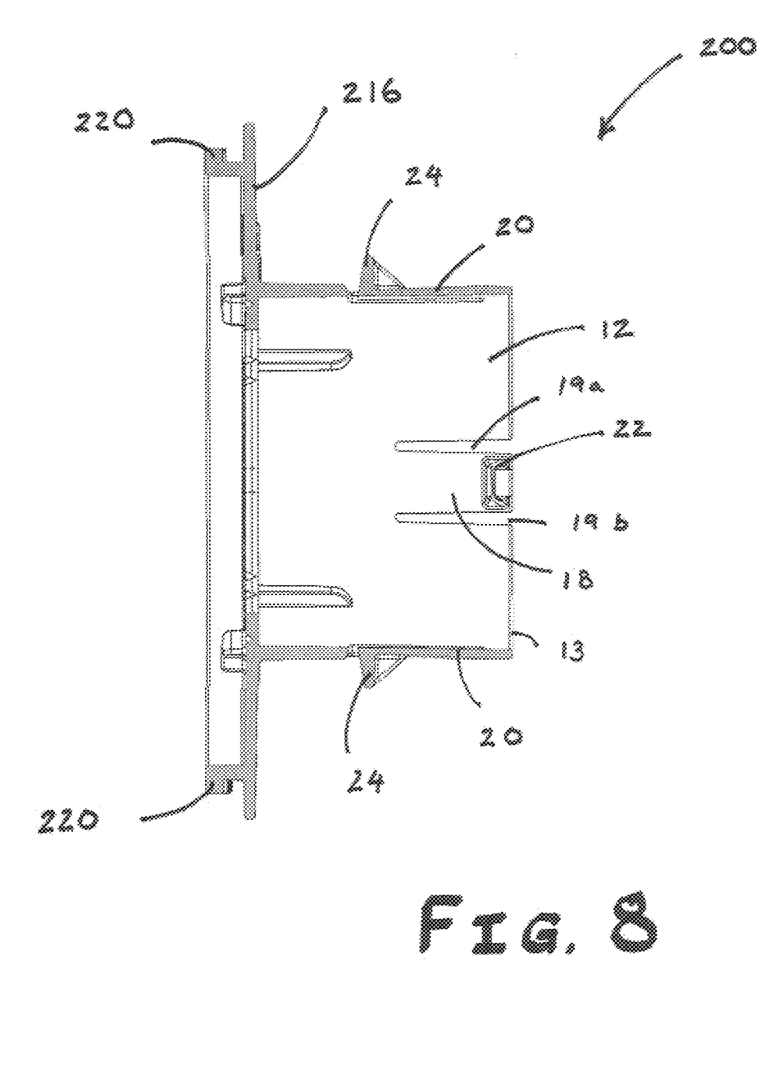
FIG. 8 shows a lateral sectional view of the pipe connector shown in FIG. 7.

In another embodiment, exemplified in FIG. 6-8, the input pipe of the previous embodiment is eliminated. The connector 200 of this embodiment retains the downstream sleeve 12, along with the two cantilevered detents 18, 20.

These elements include the novel and useful aspects of the invention described in relation to the embodiment of FIG. 1. However, the input pipe of the previous embodiment is replaced with a flange 216 and a short stub cylinder 214. The stub cylinder is configured to be inserted into an opening of a walled catch basin, not shown in FIG. 6 or FIG. 7, but well known in the prior art. The stub cylinder includes a plurality of ramped detents 220. The opening of the walled catch basin defines notches that will permit the ramped detents to pass through the opening in a known manner. When the flange 216 is pressed up to the wall of the catch basin, the connector 200 may be rotated, thereby applying an increasing force vector pulling the flange 216 ever closer to the wall of the catch basin. To enhance the friction between the detents 220 and the interior surface of the catch basin wall, serrated teeth 222 are provided on the ramped surface of the detents.

Although preferred illustrative variations of the present invention are described above, it will be apparent to those skilled in the art that various changes and modifications may be made thereto without departing from the invention. For example, it will be appreciated that combinations of the features of different embodiments may be combined to form another embodiment. It is intended in the appended claims to cover all such changes and modifications that fall within the true spirit and scope of the invention.

We claim:

1. A pipe connector comprising:
a circular flange having a central opening;
a downstream sleeve having a circular cylindrical form about an axis with a proximal end and a terminal distal end having a distal perimeter, the downstream sleeve being attached to the circular flange by the proximal end and comprising at least one first detent and at least one second detent,
wherein the at least one first detent comprises a first cantilever having a proximal end and a distal end, the first cantilever being flanked by two parallel slots extending axially through the downstream sleeve such that the two parallel slots intersect with the distal perimeter of the downstream sleeve such that the distal perimeter is not circumferentially continuous, the first cantilever being fixed at the proximal end to the downstream sleeve whereby the distal end is free to move radially inwardly and, alternatively, outwardly in relation to the downstream sleeve, further wherein the distal end of the first cantilever defines a first finger element that extends radially inwardly in relation to the downstream sleeve, the first finger element being configured for providing a mechanical restraint against axial movement by a corrugated pipe installed within a bore of the downstream sleeve;
wherein the at least one second detent comprises a second cantilever having a proximal end and a distal end, the second cantilever being flanked by two parallel slots extending axially and by a third slot extending circumferentially through the downstream sleeve, and being fixed at the distal end to the downstream sleeve whereby the proximal end is free to move radially inwardly and, alternatively, outwardly in relation to the downstream sleeve, further wherein the proximal end defines a second finger element that extends radially outwardly in relation to the downstream sleeve, the second finger element being configured for providing a mechanical restraint against axial movement by a corrugated pipe installed external to the downstream sleeve.

2. The pipe connector of claim 1, further comprising an upstream sleeve, having a circular cylindrical form about an axis, attached to the circular flange such that the downstream sleeve and the upstream sleeve are coaxial with each other.

3. The pipe connector of claim 1, further comprising a stub cylinder attached to the circular flange such that the downstream sleeve and the stub cylinder are coaxial with each other, the stub cylinder defining at least one ramped detent configured for drawing the circular flange towards a catch basin wall when the stub cylinder is inserted into an aperture in the catch basin wall.

4. The pipe connector of claim 1, wherein the at least one first detent is two first detents in number.

5. The pipe connector of claim 1, wherein the at least one second detent is two second detents in number.

* * * * *